United States Patent
Ou

(10) Patent No.: US 11,856,981 B2
(45) Date of Patent: Jan. 2, 2024

(54) TAPERED GLASS TIP FOR USE WITH SMOKABLE SUBSTANCES CONTAINED WITHIN A WRAP AND METHOD FOR MANUFACTURING THE TIP

(71) Applicant: R.Y.L. Inc., Commerce, CA (US)

(72) Inventor: Suk Hwan Ou, Commerce, CA (US)

(73) Assignee: R.Y.L. INC., Commerce, CA (US)

( * ) Notice: Subject to any disclaimer, the term of this patent is extended or adjusted under 35 U.S.C. 154(b) by 139 days.

(21) Appl. No.: 17/475,737

(22) Filed: Sep. 15, 2021

(65) Prior Publication Data

US 2023/0078034 A1    Mar. 16, 2023

(51) Int. Cl.
| | |
|---|---|
| A24D 3/18 | (2006.01) |
| A24D 1/04 | (2006.01) |
| A24F 7/00 | (2006.01) |
| C03B 23/09 | (2006.01) |
| C03B 33/095 | (2006.01) |
| C03B 23/043 | (2006.01) |
| C03B 23/045 | (2006.01) |
| C03B 23/055 | (2006.01) |

(52) U.S. Cl.
CPC ............... *A24D 3/18* (2013.01); *A24D 1/042* (2013.01); *A24F 7/00* (2013.01); *C03B 23/043* (2013.01); *C03B 23/045* (2013.01); *C03B 23/055* (2013.01); *C03B 23/092* (2013.01); *C03B 23/095* (2013.01); *C03B 33/095* (2013.01)

(58) Field of Classification Search
None
See application file for complete search history.

(56) References Cited

U.S. PATENT DOCUMENTS

| | | | |
|---|---|---|---|
| 2,368,170 A * | 1/1945 | Smith | C03B 23/095 |
| | | | 65/277 |
| 3,257,186 A * | 6/1966 | Zauner | C03B 23/095 |
| | | | 65/282 |

(Continued)

FOREIGN PATENT DOCUMENTS

| | | | | |
|---|---|---|---|---|
| DE | 102005038764 B3 * | 10/2006 | | C03B 23/045 |
| EP | 2816017 A1 | 12/2012 | | |

OTHER PUBLICATIONS

DE 10 2005 038 764 machine translation, Langer Matthais, Method for making syringes, Oct. 2006 (Year: 2006).*

(Continued)

*Primary Examiner* — Queenie S Dehghan
(74) *Attorney, Agent, or Firm* — WOMBLE BOND DICKINSON (US) LLP

(57) ABSTRACT

A method of manufacturing a tip for use with smokeable substances. A tube is rotated while applying heat to a section. The heated section is squeezed with tapered rollers and a pivoting rod is inserted. The rollers and rod are removed and heat is again applied. The heated portion is squeezed a second time with the tapered rollers and the rod is reinserted. The rollers and rod are removed and heat is again applied. The heated portion is again squeezed with the tapered rollers and the pivoting rod is again reinserted. The rollers and rod are removed and heat is applied to the end of the tube. The tube is scored above the end to form a scored line. Heat is applied to the scored line. Water is sprayed onto the scored line to split the tube into two pieces. Heat is applied to the tube at the split end.

10 Claims, 5 Drawing Sheets

(56) References Cited

U.S. PATENT DOCUMENTS

| | | | | |
|---|---|---|---|---|
| 3,362,435 | A | * | 1/1968 | Meyer ................... C03B 23/098 65/276 |
| 3,449,105 | A | * | 6/1969 | Lambden .............. C03B 23/095 65/282 |
| 2012/0060558 | A1 | * | 3/2012 | Haselhorst ............ C03B 23/092 65/29.21 |
| 2013/0269716 | A1 | | 10/2013 | Hoang et al. |
| 2016/0244354 | A1 | * | 8/2016 | Segner ................. C03B 23/095 |
| 2017/0208859 | A1 | | 7/2017 | Ou |
| 2020/0170294 | A1 | | 6/2020 | Lalehzadeh |
| 2021/0352959 | A1 | | 11/2021 | Ou et al. |

OTHER PUBLICATIONS

PCT Written Opinion for PCT/US2022/043710 dated Jan. 17, 2023 (4 pages).
International Search Report for PCT/US2022/043710 dated Jan. 17, 2023 (2 pages).

* cited by examiner

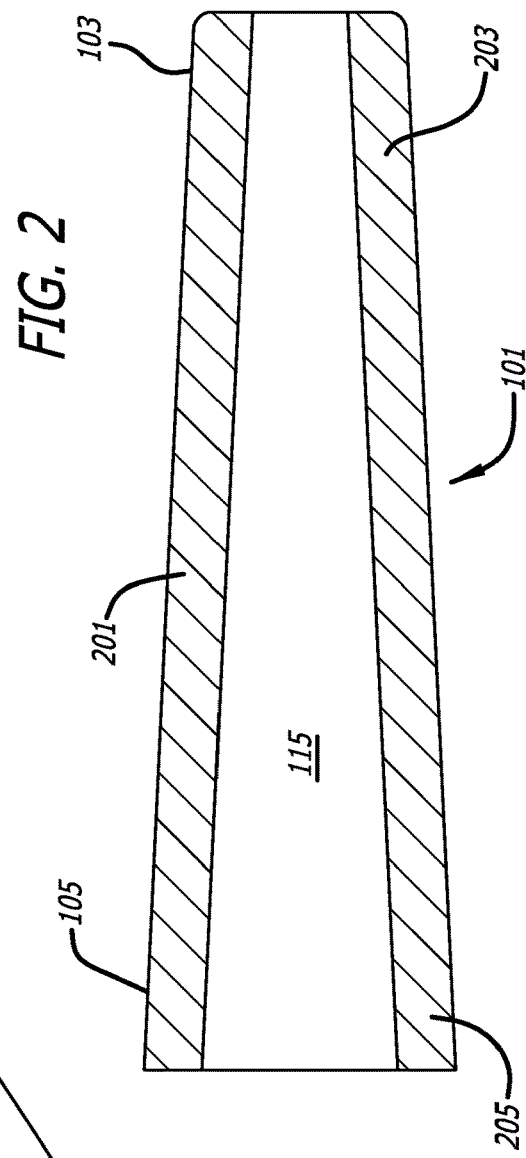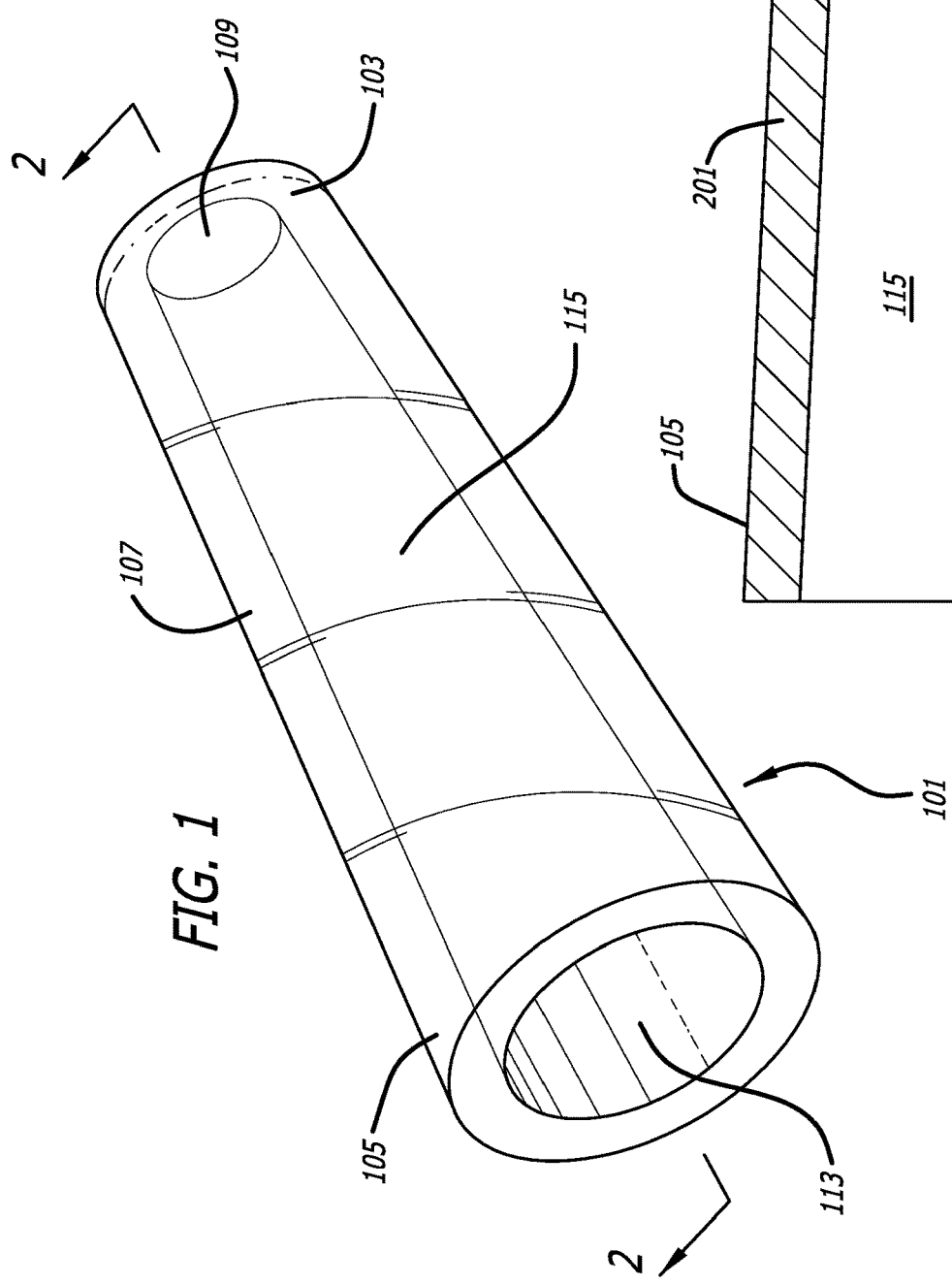

TAPERED GLASS TIP FOR USE WITH SMOKABLE SUBSTANCES CONTAINED WITHIN A WRAP AND METHOD FOR MANUFACTURING THE TIP

FIELD

The invention is directed to a tip made of glass or similar materials for use with rolled papers or similar materials containing tobacco or other smokeable substances. The invention is also directed to a method of manufacturing such a tip.

BACKGROUND

Various devices exist for smoking substances such as tobacco. The most commonly used device is a cigarette or cigar, which consists of tobacco or other smokeable substance rolled within a thin paper which can be made from a variety of products. The cigarette or cigar is ignited at one end and smoke, which is emitted from the smokeable substance (once ignited or smoldering), is inhaled or tasted from the other end. However, the paper or other substance tends to breakdown with moisture from the mouth and heat from the substance being smoked. As a result, a tip made of glass or a similar material to which the paper containing the smokeable substance is attached by being wrapped around the tip is sometimes used. Although the term tip is used herein, the device is sometimes referred to as a filter. Accordingly, the device can be considered to be either a tip or a filter.

SUMMARY

The invention is directed to a glass tip and a process of manufacturing the tip. The glass tip is for use with a substance (e.g. tobacco) to be smoked which is wrapped in paper or similar material. The tip which is generally cylindrically shaped is gradually tapered from a wide end to a narrow end. There are openings at both ends through which smoke from a smokeable substance passes when a user inhales after the substance is ignited. The smokeable substance is placed on the paper which is then wrapped around the smokeable substance to form a tube which contains the substance. A small space may be maintained at one end of the paper so that that the end when formed as part of the tube can fit over the tip, or the tip can simply be pressed into the paper tube which would force any of the smokeable substance in the tube further into the tube. Such force, although it may slightly compress the substance within the tube, has little if any effect since the amount of compression of the smokeable substance is very small.

The process for making the tapered tip includes heating a narrow section of a tube (e.g. a glass tube) in the shape of a cylinder having an opening at both ends. The heated section is near one of the two ends. The tube should be rotating at from 200 revolutions per minute (RPM) to 300 RPM during the entire process. After the tube is heated enough to manipulate it, in one embodiment, in an initial step, a pivoting steel plug is inserted into one end while pressure is applied to the rotating side wall of the tube by steel or carbon tapered rollers so that the inner diameter of the tube is reduced by the pressure from the tapered rollers while the pivoting steel plug defines the amount of the reduction, with the most reduction near the end of the tube which receives the plug while the diameter of the tube increases from that end for the length of the rollers. That is, the pin pivots at its base to create a relatively smaller amount of movement near its point of entry and a larger amount away from the point of entry as the plug extends into the tube.

After the initial step, the roller and pivoting plug are removed and the tube is reheated enough to manipulate it, the pivoting steel plug is again inserted into one end while pressure is applied to the rotating side wall of the tube by steel or carbon tapered rollers so that the inner diameter of the tube is reduced by the pressure from the tapered rollers while the pivoting steel plug defines the amount of the reduction, with the most reduction near the end of the tube which receives the plug while the diameter of the tube increases from that end for the length of the rollers. That is, the pin pivots at its base to create a relatively smaller amount of movement near its point of entry and a larger amount away from the point of entry as the plug extends into the tube. This subsequent step, although essentially identical to the initial step is necessary since heating and shaping a large area of glass presented as a spinning tube tends to wobble out of control when rotating at the specified speed. Although a lower speed could possibly be used to avoid the subsequent step, using the higher rotation speeds allows for a higher number of parts per minute being produced even with the subsequent steps of repeating the initial step.

The rollers are removed and heat is applied to the now narrowed end of the tube in order to soften its edges. A carbide scoring wheel is the applied to the tube at a location where the tube will be separated to produce a tapered tip. Heat is then applied to the scored location and a fine spray of water is applied to create a thermal shock to separate the tube and the formed tapered tip. Heat is then applied to the wide end of the tapered tip to soften its edges.

In this manner, a glass tip is formed which has a tapered cross section, that is a cylinder with a two ends, with one end larger than the other, sometimes referred to as a frustrum. The filter includes a chamber which extends from the narrow end to the wide end with an increasing diameter. In an embodiment, the taper is continuous between the two ends, but the taper need not extend the entire length of the glass tip.

In another embodiment, a tapered tip for use with a substance to be smoked wrapped in paper or similar material is provided. The tip may include a receiving chamber having an open end dimensioned to receive the end of the paper or similar material containing the smokeable substance which is wrapped around the smokeable substance to form a cylinder or cone which is attached to the tip at one end. In this regard, although the term cone is used herein, the actual shape of the wrapper in this case is a conical frustum since the end which would be the tip of the cone is not present. However, for ease of reference, and since not important to an understanding of the invention, all references to cone herein should be understood be a conical frustum. In the case of a cone, the narrow end, that is the end with the smaller diameter, is the one attached to the tip. The receiving chamber extends the length of the tapered tip to the opposite end of the tip which also has an opening to allow smoke from the smokeable substance to be inhaled. This second opening may be axially aligned with the open end of the receiving chamber. Since the tip is tapered, one of the two open ends has a larger outside diameter than the other end. In most cases, the narrow end of the cone which is attached to the tip is attached to the end of the tip with the larger diameter. However, the cone may be attached to either end of the tip.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, a given figure may be used to illustrate the features of more than one embodiment of the invention in the interest of reducing the total number of drawings, and as a result, not all elements in the figure may be required for a given embodiment.

FIG. 1 illustrates a perspective view of one embodiment of the invented tapered glass tip.

FIG. 2 illustrates cross section of the tapered glass tip taken along line 2-2 of FIG. 1.

DETAILED DESCRIPTION

Figure 3:
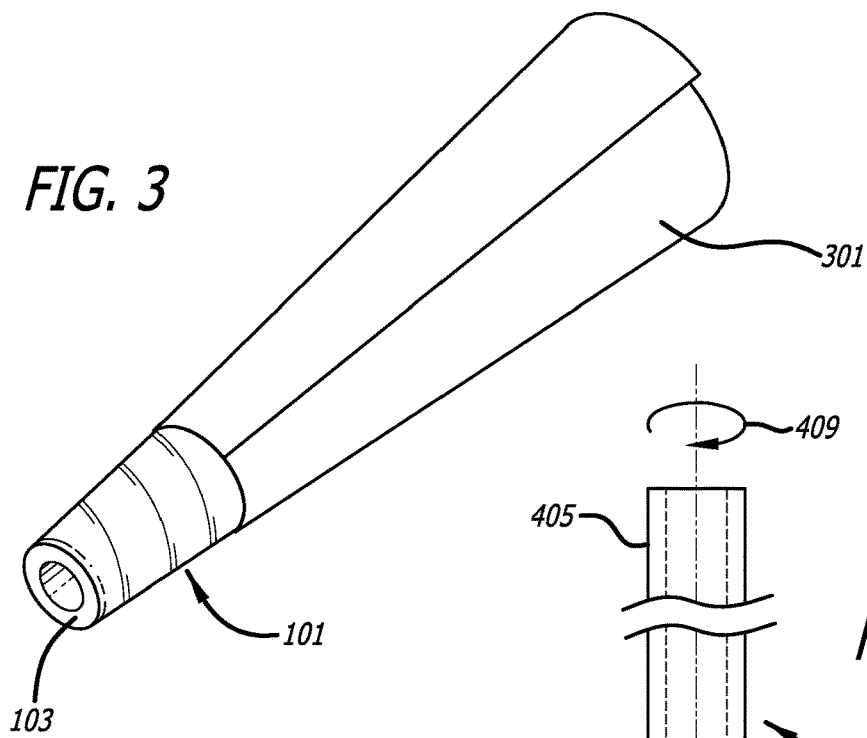
FIG. 3 illustrates the tapered glass tip with an applied wrapper.

Several embodiments of the invention with reference to the appended drawings are now explained. Whenever aspects of the embodiments described here are not explicitly defined, the scope of the invention is not limited only to the parts shown, which are meant merely for the purpose of illustration. Also, while numerous details are set forth, it is understood that some embodiments of the invention may be practiced without these details. In other instances, well-known machines, structures, and techniques have not been shown in detail so as not to obscure the understanding of this description.

FIG. 1 illustrates one embodiment of a tip from which a substance in a wrapper may be smoked. In one embodiment, tip 101 may be a tip that includes a first end portion 103, a second end portion 105 and a middle portion 107. The first end portion 103 may be substantially open by first end opening 109. The second end portion 105 may be substantially open with an opening 113 through which a fluid may pass from the first end portion to the second end portion. The fluid may, for example, be a vapor or gas given off by a substance (e.g. tobacco) within a wrapper. The middle portion 107 may be a tubular member having a substantially hollow interior 115. The substance to be smoked (e.g. tobacco) may be packed within a wrapping paper (not shown in FIG. 1) formed into cylinder or cone containing the smokeable substance by inserting second end portion 105 into one end of the cylinder or cone such that the cylinder or cone surrounds second end portion 105. During use, a flame is applied to an end of the cylinder or cone containing the smokeable substance opposite the end surrounding end portion 105 so that the substance packed within the wrapper is caused to burn or smolder and emit a vapor. The vapor from the burning or smoldering substance then can be inhaled by a user through the opening 109 after passing through opening 113 and middle portion 107. The arrangement of the wrapping paper and second end portion 105 could also be arranged so that the paper wraps around end 103 instead.

FIG. 2 illustrates a cross-sectional side view of the tip of FIG. 1 along line 2-2. From this view, it can be seen that the substantially hollow interior 115 of tip 101 is defined by wall 201, first end portion 103 is defined by wall 203, and second portion 105 is defined by wall 205. As best seen in FIG. 2, walls 201, 203 and 205 are relatively uniform in thickness.

The diameter of tip 101 should be sized so that a paper cylinder or cone containing a smokeable substance will fit around end 105 of tip 101 and held in place by friction and/or an adhesive, which may be moisture activated, applied to tip 101 and/or the end of the wrapper which fits around end 105. As noted above, the paper could be wrapped around end 103 rather than end 105.

FIG. 3 shows tip 101 with a wrapper 301 containing a smokeable substance attached to end 105 of tip 101. As shown in FIG. 3, wrapper 301 is in the shape of a cone with its narrow end around end 105. Although wrapper 301 is not part of the invention, it is shown in FIG. 3 to illustrate how tip 101 is used with wrapper 301. As previously noted, wrapper 301 could also be in the form of a cylinder. The are many known techniques for filling wrapper 301 with a smokeable substance and forming the wrapper into a cone (or cylinder). However, since the details surrounding wrapper 301 and its smokeable substance content are not needed for an understanding of the invention, such details are not set forth herein. However, as should be evident, the amount of overlap of wrapper 301 with tip 101 should be sufficient to ensure that the wrapper remains attached to the tip while in use, without extending too close to end 103.

Figure 4:
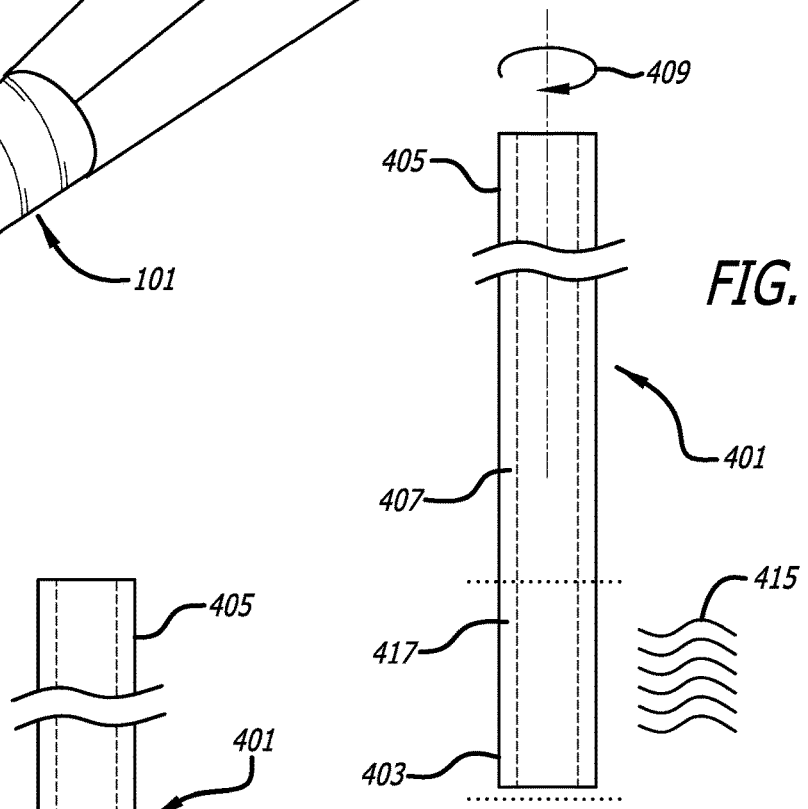
FIG. 4 illustrates a glass tube being processed with a first step during which heat is applied to a portion of the tube as the tube is rotating.

FIG. 4 illustrates a side view of one embodiment of a tube from which a tip for use with a wrapper may be manufactured. Tube 401 may, for example, be a glass tube made from clear borosilicate glass (33 exp) such as that available from Pacific Vial Manufacturing Inc., of Commerce, California Tube 401 may include a first end portion 403 and a second end portion 405 which are connected by a middle portion 407. The second end portion is shown as being separated from middle portion 407. However, tube 401 is a single continuous piece from which multiple glass tips are formed. After each tip is formed as described with reference to FIGS. 4-14, the tube 401 is lowered so as to enable the next tip to be formed by repeating steps 1-11 until the entire length of tube 401 has been utilized to make additional tips.

As shown in FIG. 4, tube 401 may be rotated as shown by arrow 409 throughout all of the processing operations as disclosed herein. In an embodiment, tube 401 may be rotated at a rate of from about 200 revolutions per minute (RPM) to about 300 RPM during the entire process described with reference to FIGS. 4-14. Tube 401 may be rotated by inserting tube 401 into any conventional machine operable to rotate a tube at the desired RPM.

During a first step, once tube 401 is rotating, heat 415 may be applied to section 417 of tube 401. The heat 415 may be applied by, for example, a burner aligned with section 417 of tube 401. In an embodiment, oxygen, natural gas and compressed air are combined to form a flame so that the temperature of the applied heat is set so that the glass to which it is being applied will soften so that the glass is easily stretched and shaped as is well known in the art. However, by way of example, the working point temperature for clear borosilicate glass (33 exp) is 1240° C., with a softening point of 825° C. and an annealing point of 565° C. The specifics of the ratios of the, oxygen, natural gas and compressed air to reach the desired temperature depend on the type of glass or other material used to make the tip, the specifics of which are well known in the art. Heating section 417 softens the glass material of tube 401 so that the heated portion of the tube may be squeezed in as explained below.

Figure 5:
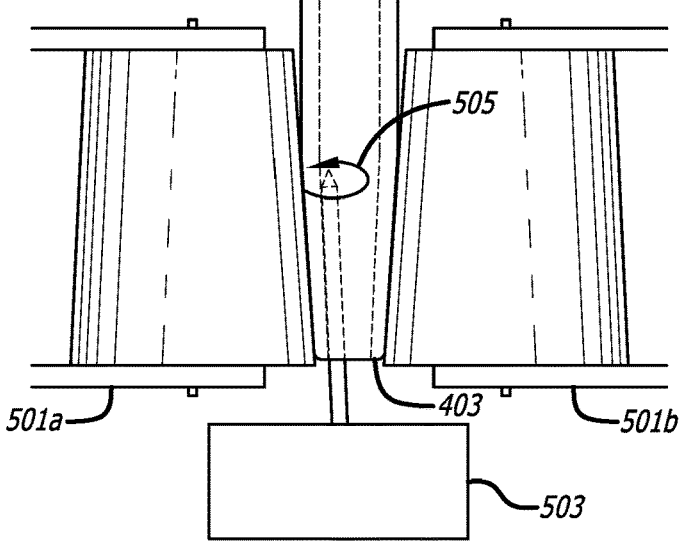
FIG. 5 illustrates the glass tube being processed with a second step during which a pair of tapered rollers apply pressure to the portion of the tube heated during the first step while a pivoting plug is inserted into the end of the tube which had heat applied.

As shown in FIG. 5, during a second step, once section 417 shown in FIG. 4 has been sufficiently heated, rollers 501a and 501b which in an embodiment are made of steel or carbon apply an inward force, tapered towards end 403, while a steel rod 503 is inserted into end 403. The rod pivots from its base so that the pressure from rollers 501a and 501b causes the taper to be formed while preventing the inner walls of tube 401 from collapsing. The pivot causes rod 503 to rotate 505 along a relatively small circumference near end 403 which circumference increases in size above end 403. In an embodiment, the pressure from the rollers and rod is about 2-4 pounds per square inch and is applied for about 3 seconds. The specifics of the amount of pressure and time may vary based on the rotation speed, material used and amount of heat applied.

In order to ensure that the taper is properly formed, in an embodiment, after step 2, in steps 3-6 as shown in FIGS. 6-9, the heating and squeezing of steps 1 and 2 are repeated two more times. The reason the steps are repeated is that in order to heat and shape large areas of glass while rotating at 200-300 RPM, which is necessary to produce more pieces in a unit of time, the steps must be repeated to prevent the tube from wobbling while spinning at the required speed.

Figure 6:
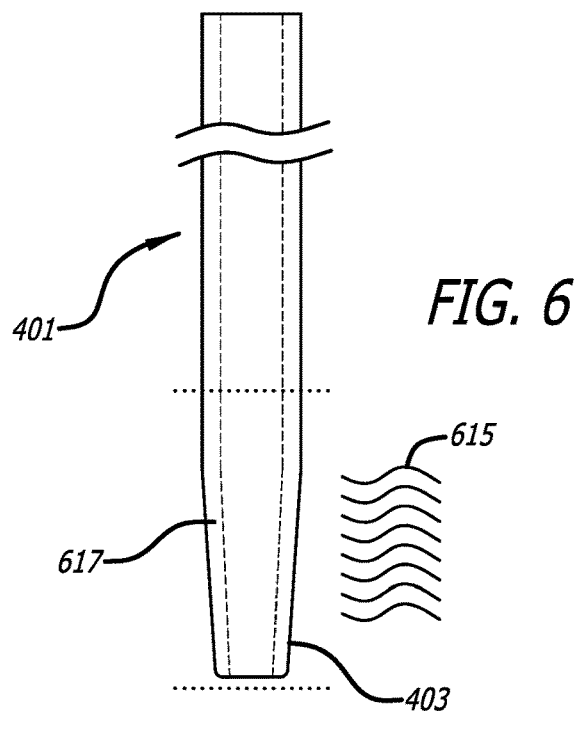
FIG. 6 illustrates the glass tube being processed with a third step during heat is again applied to the same portion of the tube as it rotates.
Figure 7:
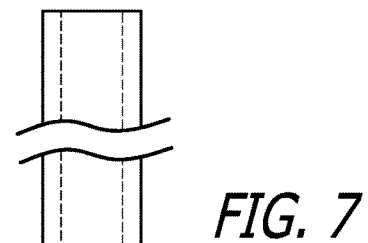
FIG. 7 illustrates the glass tube being processed with a fourth step during which a pair of tapered rollers apply pressure to the portion of the tube heated during the third step while a pivoting plug is inserted into the end of the tube which had heat applied in a manner similar to the second step.

In step 3 shown in FIG. 6, heat 615 is applied to a slightly longer section 617 of tube 401 as shown in FIG. 6. In step 4, tapered rollers 501a and 501b and pivoting steel rod 503 are again applied to the heated section 617 of tube 401 to further taper the end of the tube as shown in FIG. 7.

Figure 8:
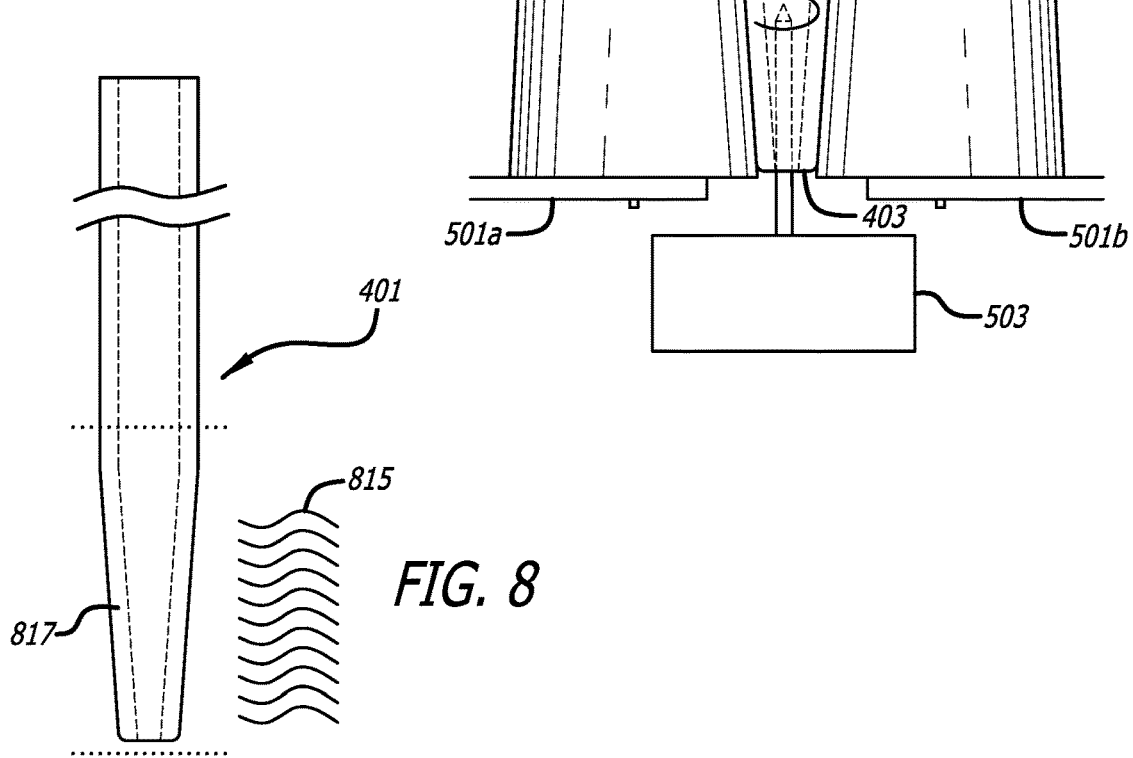
FIG. 8 illustrates the glass tube being processed with a fifth step during which heat is again applied to the same portion of the tube as it rotates.
Figure 9:
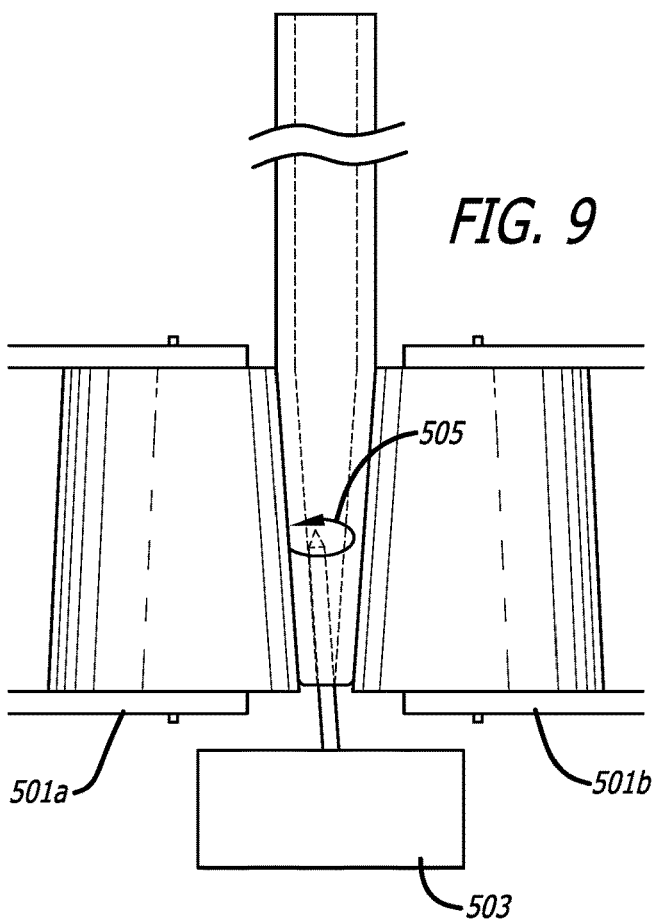
FIG. 9 illustrates the glass tube being processed with a sixth step during which illustrates the glass tube being processed during which a pair of tapered rollers apply pressure to the portion of the tube heated during the fifth step while a pivoting plug is inserted into the end of the tube which had heat applied in a manner similar to steps 2 and 4.

In step 5 shown in FIG. 8, heat 815 is applied to a slightly longer section 817 of tube 401 as shown in FIG. 8. In step 6, tapered rollers 501a and 501b and pivoting steel rod 503 are again applied to the heated section 817 of tube 401 to further taper the end of the tube as shown in FIG. 9.

The reason heat 815 is applied to a slightly longer section 817 of tube 401, and heat 615 is applied to a slightly longer section 617 of tube 401, which is also slightly longer that the section 417 as to heat 415 is that as tube 401 is heated and squeezed during steps 2, 3 and 5, the tube gets slightly longer as the glass is squeezed.

After step 6, end of tube 401 is tapered to a desired amount. The desired amount of tapering is not important for a proper understanding of the invention, but the amount of taper which can be made at each step is limited by the speed of rotation and temperature of the heat, but the principle remains the same in that more taper over a larger section of glass may require that steps 1-6 be repeated multiple times, with different heat applied as explained above.

Figure 10:
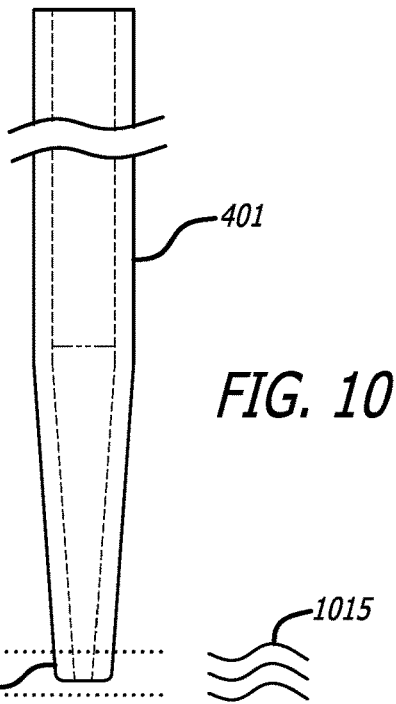
FIG. 10 illustrates the glass tube being processed with a seventh step during which the heat is applied to the end of the tube which will become the tapered tip to soften its edges.

In step 7, as shown in FIG. 10, the end of the tapered tip may not be smooth, so heat 1015 is applied to the end 403 of the tip to smooth it out.

Figure 11:
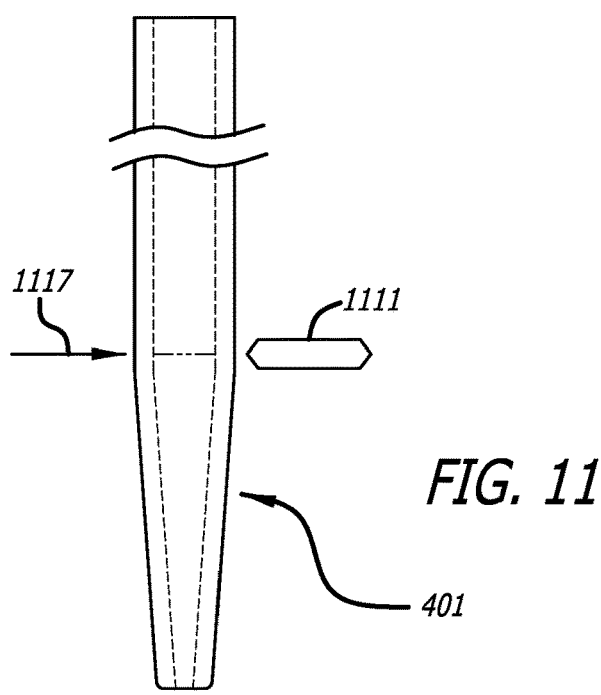
FIG. 11 illustrates the glass tube being processed with an eighth step during which a portion of the glass tube is scratched with a carbide scoring wheel.
Figure 12:
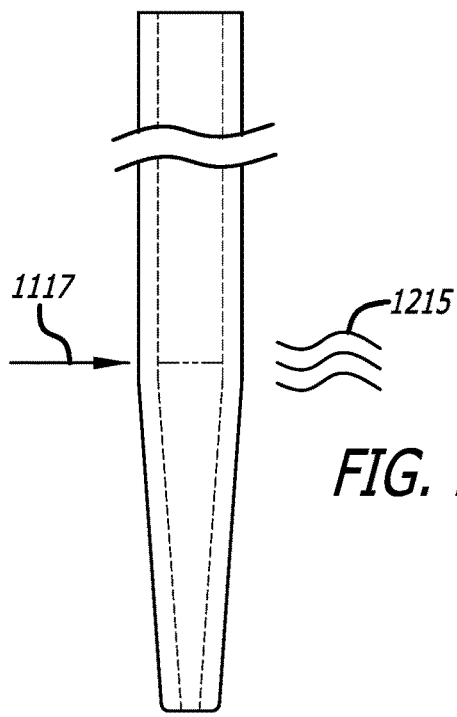
FIG. 12 illustrates the glass tube being processed with a ninth step during which heat is applied the portion of the glass tube scratched during the eighth step.
Figure 13:
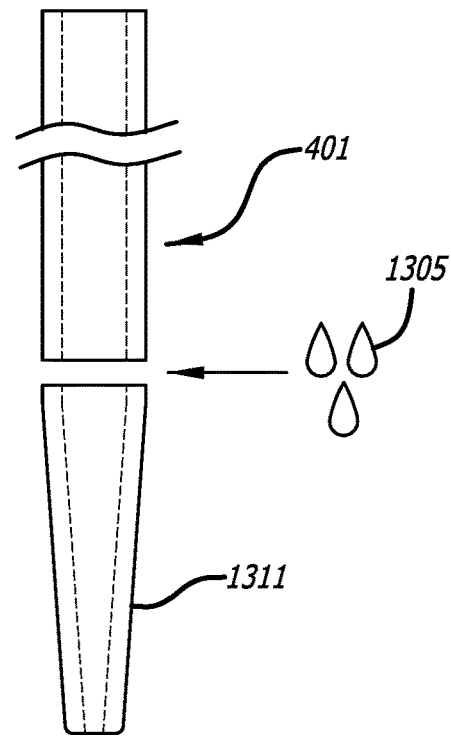
FIG. 13 illustrates the glass tube being processed with a tenth step during which a fine spray of water is applied the portion of the glass tube scratched during the eighth step and heated during the ninth step so that it separates at that portion.
Figure 14:
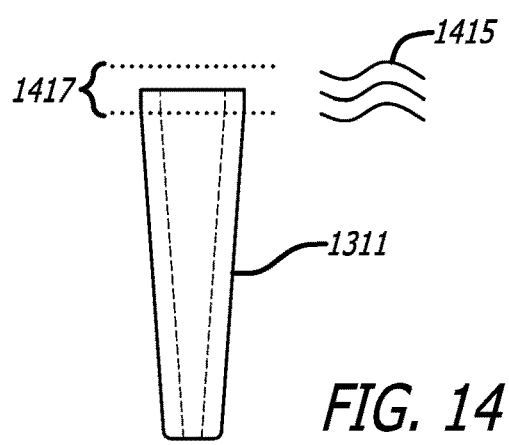
FIG. 14 illustrates the portion separated during the tenth step being processed with an eleventh step during which heat is applied to the top of the separated portion to soften its edges.

In step 8, as shown in FIG. 11, a carbide scoring wheel 1111 is applied to tube 401 at a section 1117 which corresponds to the length of the tapered tip being produced. In step 9, heat 1215 is applied to the scored section as shown in FIG. 12. In step 10, a fine mist of water 1305 is sprayed onto section 1117 which creates a thermal shock to split tube 401 into two pieces with section 1311 being the tapered tip. In step 11, as shown in FIG. 14, heat 1415 is applied to the top 1417 of section 1311 to soften its edges.

In this manner, a tapered tip 101 as shown in FIG. 1 is formed. The taper extends the entire length of the tip to form a conical frustrum. At this point, tube 401 is shorter in length by the length of a single tapered tip 101. In this manner, steps 1-11 are repeated to produce additional tapered tips 101 until the length of tube 401 has been consumed by the process. In an embodiment, the glass tube introduced in step 1 has a length of about 60 inches, from which approximately 40 glass tips can be produced. Of course, the number of tips produced is a function of the original length of glass tube 401 and the length of each tip 101.

It should be noted that although specific processing parameters (e.g. rotation speed) may be disclosed herein, the parameters can vary depending upon, for example, the machine speed. For example, the heating time of the vial during any processing step disclosed herein depends on machine speed, which may produce around 10 parts per minute (ppm) at a rotation speed of for example, from 200-300 RPM depending on machine speed and desired result. At 10 ppm, heat is applied for about 3 seconds per piece. As noted above, the specific temperatures, and times are dependent on the specifics of the glass or other material used to make the tip. Such specifics are well known to persons having ordinary skill in the art and therefore need not be further disclosed herein.

The direction of applied heat and pressure from rollers as shown in the Figures is horizontal while the direction of the steel rod in FIGS. 5, 7 and 9 is vertical. Of course, these directions depend on the orientation of the machine used in the process, and such directions instead of vertical and horizontal, can be horizontal and vertical, respectively. Accordingly, all references to vertical and horizontal should be understood to mean perpendicular to each other without regard to specific directions.

While certain embodiments have been described and shown in the accompanying drawings, it is to be understood that such embodiments are merely illustrative of and not restrictive on the broad invention. For example, although a glass tip for smoking is described herein, it is contemplated that the tip may be made of any non-flammable material can be manipulated and shaped as described herein and that will hold its shape in use while smoking a smokeable substance. Representatively, the tube may be a made of another inflammable material such as a ceramic or insulated metal material. In addition, it should be understood that each of the processing operations disclosed herein may be performed by a single machine or a combination of machines, such that each of the steps are considered automated and capable of being performed without user intervention. Thus, the invention is not limited to the specific constructions and arrangements shown and described herein and various other modifications may occur to those of ordinary skill in the art.

What is claimed is:

1. A method of manufacturing a tip for use with smokeable substances, the method comprising:
   continuously rotating a tube along its longitudinal axis in one direction;
   applying heat to a first section of the rotating tube adjacent one end of said rotating tube;
   squeezing said heated first section with tapered rollers, said tapered rollers inwardly tapered towards said one end;
   inserting a pivoting rod having a first end and a second end into said end of said tube corresponding to said heated first section;
   rotating said pivoting rod after said inserting, wherein said first end rotates around a circumference smaller than a circumference around which said second end rotates;
   removing said rollers and said pivoting rod;
   applying heat to said one end of said tube;
   scoring said tube to form a score line distal from said one end;
   applying heat to said scored line;
   spraying water mist on said heated scored line to cause a thermal shock to split said tube at said scored line into two pieces, one of which includes said one end;
   applying heat to said one piece at a second end of said one piece opposite said one end, wherein said one piece forms a continuous taper from said one end to said second end.

2. The method defined by claim 1 wherein said heat applied to said first section of the rotating tube is with a burner aligned with said first section of the rotating tube.

3. The method defined by claim 2 wherein said burner uses oxygen, natural gas and compressed air combined to form a flame so that the temperature of the applied heat is set to soften the tube to enable the tube to be shaped.

4. The method defined by claim 1 wherein said rotating of said tube is from 200-300 RPM.

5. The method defined by claim 1 where a pressure applied by said tapered rollers and rod is approximately 2-4 pounds per square inch.

6. The method defined by claim 5 wherein the pressure is applied for approximately 3 seconds.

7. The method defined by claim 1 wherein said continuously rotating, applying heat to said first section, squeezing, inserting and rotating said pivoting rod, removing said rollers and pivoting rod, applying said heat to said one end of said tube, scoring, applying heat to said scored line, spraying and applying said heat to said one piece at said second end are performed repeatedly to produce a plurality of tips from a single tube.

8. The method of claim 1 wherein said tube is a glass material.

9. The method of claim 1 wherein each of said steps is performed serially using a single machine configured to perform each of said steps serially.

10. The method defined by claim 1 further comprising:
    before said removing said rollers and said pivoting rod and applying said heat to said one end of said tube, removing said rollers and pivoting rod and applying second heat to a second section of said tube adjacent said first section;
    after said applying said second heat, squeezing said second section with said tapered rollers and reinserting said pivoting rod into said one end of said tube;
    rotating said pivoting rod after said inserting, wherein said first end rotates around a circumference smaller than a circumference around which said second end rotates;
    removing said rollers and pivoting rod and applying third heat to third section of said tube;
    after said applying third heat, squeezing said third heated section with said tapered rollers and reinserting said pivoting rod into said end of said tube corresponding to said third heated portion, said rotating said pivoting rod after said reinserting.

* * * * *